United States Patent
Elsherif et al.

(10) Patent No.: US 9,655,135 B2
(45) Date of Patent: May 16, 2017

(54) ROBUST SYSTEMATIC MULTI-USER (MU) GROUPING AND SCHEDULING

(71) Applicant: QUALCOMM Incorporated, San Diego, CA (US)

(72) Inventors: Ahmed Ragab Elsherif, Santa Clara, CA (US); Qinghai Gao, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 53 days.

(21) Appl. No.: 14/731,120

(22) Filed: Jun. 4, 2015

(65) Prior Publication Data

US 2016/0360543 A1 Dec. 8, 2016

(51) Int. Cl.
| | |
|---|---|
| H04B 7/04 | (2017.01) |
| H04W 72/12 | (2009.01) |
| H04W 72/04 | (2009.01) |
| H04B 7/0452 | (2017.01) |

(52) U.S. Cl.
CPC ........ *H04W 72/121* (2013.01); *H04B 7/0452* (2013.01); *H04W 72/046* (2013.01)

(58) Field of Classification Search
CPC .. H04B 7/0613; H04B 7/0686; H04B 7/0602; H04B 7/0413; H04B 7/0452; H04B 7/0817; H04B 7/0822; H04B 7/02; H04B 7/024; H04B 7/026
See application file for complete search history.

(56) References Cited

U.S. PATENT DOCUMENTS

| | | | | |
|---|---|---|---|---|
| 7,788,522 | B1* | 8/2010 | Abdelaziz | H04L 41/12 709/209 |
| 8,472,383 | B1* | 6/2013 | Banerjea | H04W 72/0473 370/328 |
| 9,331,883 | B1* | 5/2016 | Schelstraete | H04L 27/2626 |
| 2003/0012168 | A1* | 1/2003 | Elson | G01D 9/005 370/338 |
| 2012/0039266 | A1* | 2/2012 | Abraham | H04B 7/0452 370/329 |

(Continued)

FOREIGN PATENT DOCUMENTS

WO WO-2012087539 A1 6/2012

OTHER PUBLICATIONS

International Search Report and Written Opinion—PCT/US2016/031095—ISA/EPO—Aug. 26, 2016.

(Continued)

*Primary Examiner* — Mohamed Kamara
(74) *Attorney, Agent, or Firm* — Patterson & Sheridan

(57) ABSTRACT

Certain aspects of the present disclosure relate to a robust and systematic multi-user (MU) grouping and scheduling scheme. Certain aspects of the present disclosure provide an apparatus for wireless communications. The apparatus generally includes a processing system configured to: assign devices to one or more groups, wherein each group has at least a number of devices and schedule MU multiple-input multiple-output (MIMO) transmissions to one or more sets of devices, each scheduled set of devices comprising a subset of devices of one of the groups; and an interface configured to output data for simultaneous transmissions to the scheduled sets of devices.

23 Claims, 13 Drawing Sheets

(56) References Cited

U.S. PATENT DOCUMENTS

2012/0224519 A1* 9/2012 Kwon ................ H04B 7/0452
370/311

OTHER PUBLICATIONS

Kim J., et al., "GroupID Concept for Downlink MU-MIMO Transmission", Jan. 18, 2010 (Jan. 18, 2010), pp. Slide 1-Slide 8, XP002645417, Retrieved from the Internet: URL:https://mentor.ieee.org/.../11-10-0073 -00-00ac-group-id-concept-for-dl-mu-mimo.ppt [retrieved on Jun. 28, 2011].

* cited by examiner

| #MU clients (M) | Formed Groups | Scheduling Sequences | #GIDs | Group Type |
|---|---|---|---|---|
| 3 | ABC | ABC, BCA, CAB | 1 | MU3 |
| 4 | ABCD | ABC, BCD, CDA, DAB | 1 | MU3 |
| 5 | ABC+DE | ABC, BCA, CAB, DE, ED | 2 | MU3+MU2 |
| 6 | ACD+DEF | ABC, BCA, CAB, DEF, EFD, FDE | 2 | MU3 |

800

| #MU clients (M) | Formed Groups | Scheduling Sequence | #GIDs | Group Type |
|---|---|---|---|---|
| 4 | ABCD | ABC, BCD, CDA, DAB | 1 | MU3 |
| 5 | ABCD, CDEA, EABC | ABC, BCD, CDE, DEA, EAB | 3 | MU3 |
| 6 | ABCD, CDEF, EFAB | ABC, BCD, CDE, DEF, EFA, FAB | 3 | MU3 |
| 7 | ABCD, CDEF, EFGA, GABC | ABC, BCD, CDE, DEF, EFG, FGA, GAB | 4 | MU3 |
| 8 | ABCD, CDEF, EFGH, GHAB | ABC, BCD, CDE, DEF, EFG, FGH, GHA, HAB | 4 | MU3 |
| 9 | ABCD, CDEF, EFGH, GHIA, IABC | ABC, BCD, CDE, DEF, EFG, FGH, GHI, HIA, IAB | 5 | MU3 |
| 10 | ABCD, CDEF, EFGH, GHIJ, IJAB | ABC, BCD, CDE, DEF, EFG, FGH, GHI, HIJ, IJA JAB | 5 | MU3 |
| 11 | ABCD, CDEF, EFGH, GHIJ, IJKA, JKAB | ABC, BCD, CDE, DEF, EFG, FGH, GHI, HIJ, IJK JKA, KAB | 6 | MU3 |
| 12 | ABCD, CDEF, EFGH, GHIJ, IJKL, KLAB | ABC, BCD, CDE, DEF, EFG, FGH, GHI, HIJ, IJK JKL, KLA, LAB | 6 | MU3 |
| ... | ... | ... | ... | MU3 |

| #MU clients (M) | Formed Groups | Scheduling Sequence | #GIDs | Group Type |
|---|---|---|---|---|
| 4 | ABCD | ABC, BCD, CDA, DAB | 1 | MU3 |
| 5 | ABCD, CDEA, EABC | ABC, DEA, BCD, EAB, CDE | 3 | MU3 |
| 6 | ABCD, CDEF, EFAB | ABC, DEF, BCD, EFA, CDE, FAB | 3 | MU3 |
| 7 | ABCD, CDEF, EFGA, GABC | ABC, DEF, GAB, CDE, FGA, BCD, EFG | 4 | MU3 |
| 8 | ABCD, CDEF, EFGH, GHAB | ABC, DEF, GHA, BCD, EFG, HAB, CDE, FGH | 4 | MU3 |
| 9 | ABCD, CDEF, EFGH, GHIA, IABC | ABC, DEF, GHI, BCD, EFG, HIA, CDE, FGH, IAB | 5 | MU3 |
| 10 | ABCD, CDEF, EFGH, GHIJ, IJAB | ABC, DEF, GHI, JAB, CDE, FGH, IJA, BCD, EFG, HIJ | 5 | MU3 |
| 11 | ABCD, CDEF, EFGH, GHIJ, IJKA, JKAB | ABC, DEF, GHI, JKA, BCD, EFG, HIJ, KAB, CDE, FGH, IJK | 6 | MU3 |
| 12 | ABCD, CDEF, EFGH, GHIJ, IJKL, KLAB | ABC, DEF, GHI, JKL, BCD, EFG, HIJ, KLA, CDE, FGH, IJK, LAB | 6 | MU3 |
| ... | ... | ... | ... | MU3 |

FIG. 10

| #MU clients (M) | Formed Groups | Scheduling Sequence | #GIDs | Group Type |
|---|---|---|---|---|
| 7 | ABCD, CDEF, EFGA, GABC | ABC, BCD, CDE, DEF, EFG, FGA, GAB | 5 | MU3 |

TIMES EACH STA IS TARGETED AT ANY GIVEN TIME IN THE SEQUENCE

| TX | Set | A | B | C | D | E | F | G | Max Δ |
|---|---|---|---|---|---|---|---|---|---|
| 1 | ABC | 1 | 1 | 1 | - | - | - | - | 1 |
| 2 | BCD | 1 | 2 | 2 | 1 | - | - | - | 2 |
| 3 | CDE | 1 | 2 | 3 | 2 | 1 | - | - | 3 |
| 4 | DEF | 1 | 2 | 3 | 3 | 2 | 1 | - | 3 |
| 5 | EFG | 1 | 2 | 3 | 3 | 3 | 2 | 1 | 2 |
| 6 | FGA | 2 | 2 | 3 | 3 | 3 | 3 | 2 | 1 |
| 7 | GAB | 3 | 3 | 3 | 3 | 3 | 3 | 3 | 0 |

FIG. 11

| #MU clients (M) | Formed Groups | Scheduling Sequence | #GIDs | Group Type |
|---|---|---|---|---|
| 7 | ABCD, CDEF, EFGA, GABC | ABC, DEF, GAB, CDE, FGA, BCD, EFG | 5 | MU3 |

TIMES EACH STA IS TARGETED AT ANY GIVEN TIME IN THE SEQUENCE

| TX | Set | A | B | C | D | E | F | G | Max Δ |
|---|---|---|---|---|---|---|---|---|---|
| 1 | ABC | 1 | 1 | 1 | - | - | - | - | 1 |
| 2 | DEF | 1 | 1 | 1 | 1 | 1 | 1 | - | 1 |
| 3 | GAB | 2 | 2 | 1 | 1 | 1 | 1 | 1 | 1 |
| 4 | CDE | 2 | 2 | 2 | 2 | 2 | 1 | 1 | 1 |
| 5 | FGA | 3 | 2 | 2 | 2 | 2 | 2 | 2 | 1 |
| 6 | BCD | 3 | 3 | 3 | 3 | 2 | 2 | 2 | 1 |
| 7 | EFG | 3 | 3 | 3 | 3 | 3 | 3 | 3 | 0 |

1100A

1200

| UID | GID$_p$ |
|---|---|
| A(0) | 1 |
| B(1) | 1 |
| C(2) | 2 |
| D(3) | 2 |
| E(4) | 3 |
| F(5) | 3 |
| G(6) | 4 |
| ... | ... |

FIG. 12

ROBUST SYSTEMATIC MULTI-USER (MU) GROUPING AND SCHEDULING

BACKGROUND

Field of the Disclosure

Certain aspects of the present disclosure generally relate to wireless communications and, more particularly, to a robust and system multi-user (MU) grouping and scheduling scheme.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Aspects of the present disclosure generally relate to robust and systematic multi-user (MU) grouping and scheduling.

Certain aspects of the present disclosure provide an apparatus for wireless communications. The apparatus generally includes a processing system configured to: assign devices to one or more groups, wherein each group has at least a number of devices and schedule MU multiple-input multiple-output (MIMO) transmissions to one or more sets of devices, each scheduled set of devices comprising a subset of devices of one of the groups; and an interface configured to output data for simultaneous transmissions to the scheduled sets of devices.

Certain aspects of the present disclosure provide a method for wireless communications. The method generally includes assigning devices to one or more groups, wherein each group has at least a number of devices, scheduling MU MIMO transmissions to one or more sets of devices, each scheduled set of devices comprising a subset of devices of one of the group, and outputting data for simultaneous transmissions to the scheduled sets of devices.

Certain aspects of the present disclosure provide an apparatus for wireless communications. The apparatus generally includes means for assigning devices to one or more groups, wherein each group has at least a number of devices, means for scheduling MU MIMO transmissions to one or more sets of devices, each scheduled set of devices comprising a subset of devices of one of the groups, and means for outputting data for simultaneous transmissions to the scheduled sets of devices.

Certain aspects of the present disclosure provide a computer program product for wireless communications. The computer program product generally includes a computer readable medium having instructions stored thereon for: assigning devices to one or more groups, wherein each group has at least a number of devices, scheduling MU MIMO transmissions to one or more sets of devices, each scheduled set of devices comprising a subset of devices of one of the groups, and outputting data for simultaneous transmissions to the scheduled sets of devices.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a table illustrating an approach for MU grouping and scheduling, in accordance with certain aspects of the present disclosure.

FIG. 10 is a table illustrating an enhanced approach for MU grouping and scheduling, in accordance with certain aspects of the present disclosure.

FIG. 11 is a table illustrating the number of times each station is targeted for transmission at a given time during the scheduling sequence illustrated in FIG. 8, in accordance with certain aspects of the present disclosure.

FIG. 12 is a table illustrating an example one-to-one mapping of user ID to GID for seven MU clients, in accordance with certain aspects of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
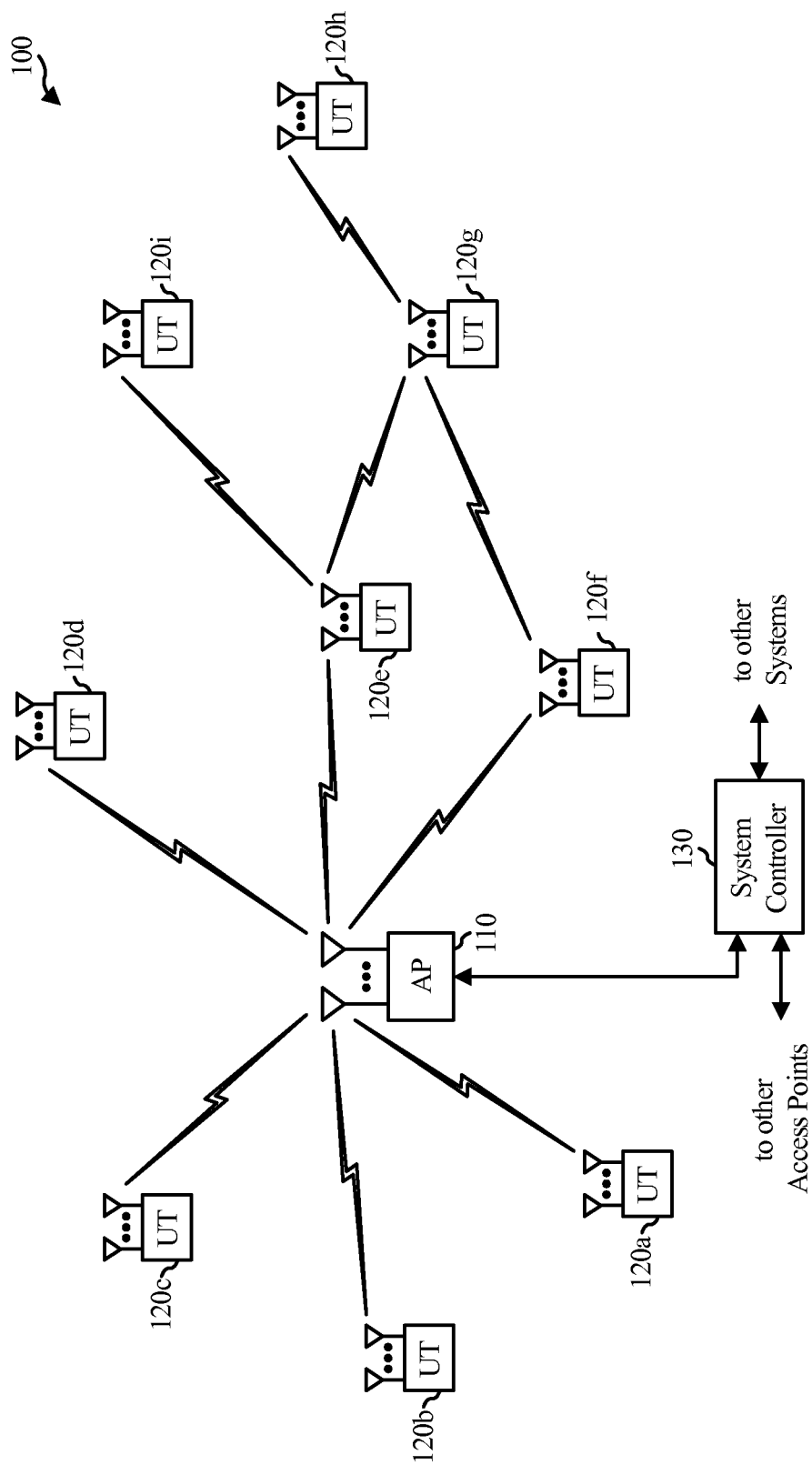
FIG. 1 illustrates an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure generally relate to wireless communications and, more particularly, to a robust and systematic multi-user (MU) grouping and scheduling scheme. As will be described in more detail herein, devices (e.g., MU capable stations) may be grouped and scheduled in order to ensure a consistent throughput. For example, using a round-robin type algorithm, the stations may be grouped in groups of four and scheduled subsets (e.g., sets of three) for MU MIMO transmission (i.e., MU3 transmissions).

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communication System

FIG. 1 illustrates a system 100 in which aspects of the disclosure may be performed. For example, user terminals 120 may be configured to communicate with the access point 110 via multi-user (MU) transmissions. The access point 110 may use a round-robin type algorithm to assign the user terminals 120 into a plurality of groups, for example, into groups of four. The access point 110 may schedule subsets of the user terminals 120 in the groups for MU MIMO transmissions.

The system 100 may be, for example, a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
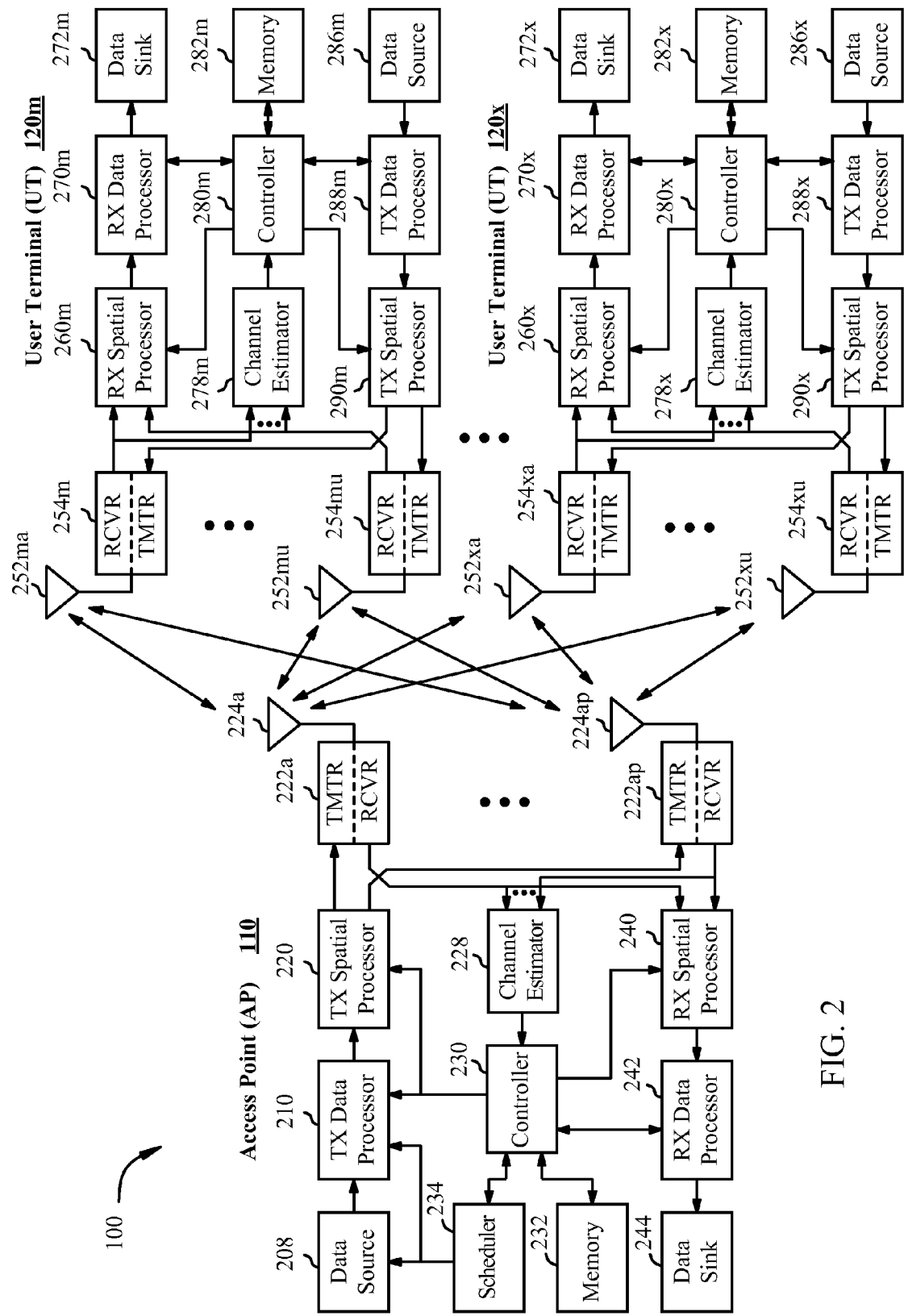
FIG. 2 is a block diagram of an example access point (AP) and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, processors 210, 220, 240, 242, and/or controller 230 of access point 110 may be used to perform the operations described herein and illustrated with reference to FIGS. 6 and 6A.

FIG. 2 illustrates a block diagram of access point 110 two user terminals 120m and 120x in a MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals. The decoded data for each user terminal may be provided to a data sink 272 for storage and/or a controller 280 for further processing.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
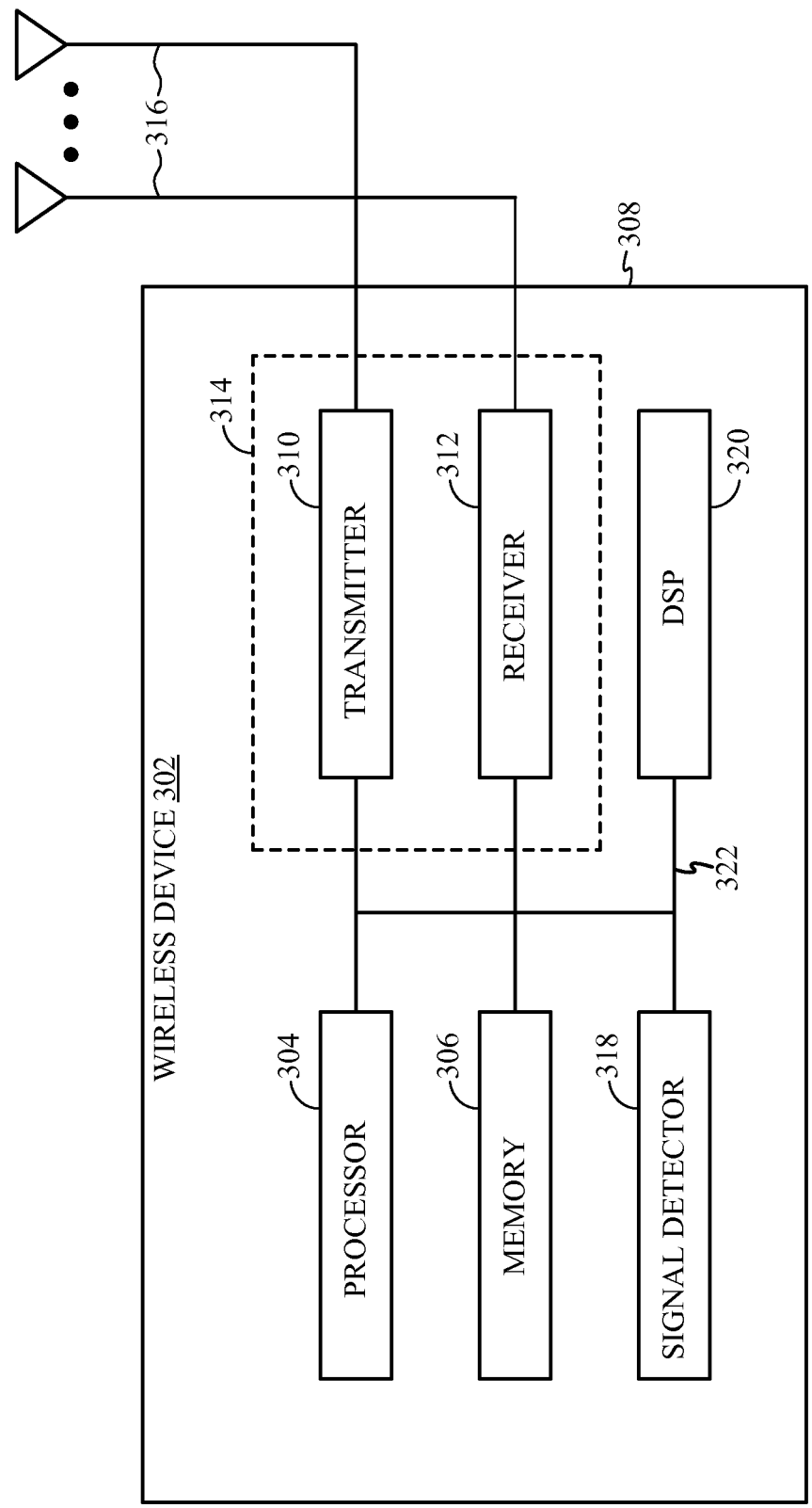
FIG. 3 is a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 600 and illustrated in FIG. 6. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Multi-User MIMO Communication

As used herein, the term multiple user (MU) transmission generally refers to a transmission from an access point to multiple users (whether sent as simultaneous or sequential packets within a transmit opportunity) or to a transmission to an access point from multiple users (whether sent as simultaneous or sequential packets within a transmit opportunity), while the term single user (SU) transmission generally refers to a transmission from an access point to a single user or to a transmission to an access point from a single user.

Figure 4:
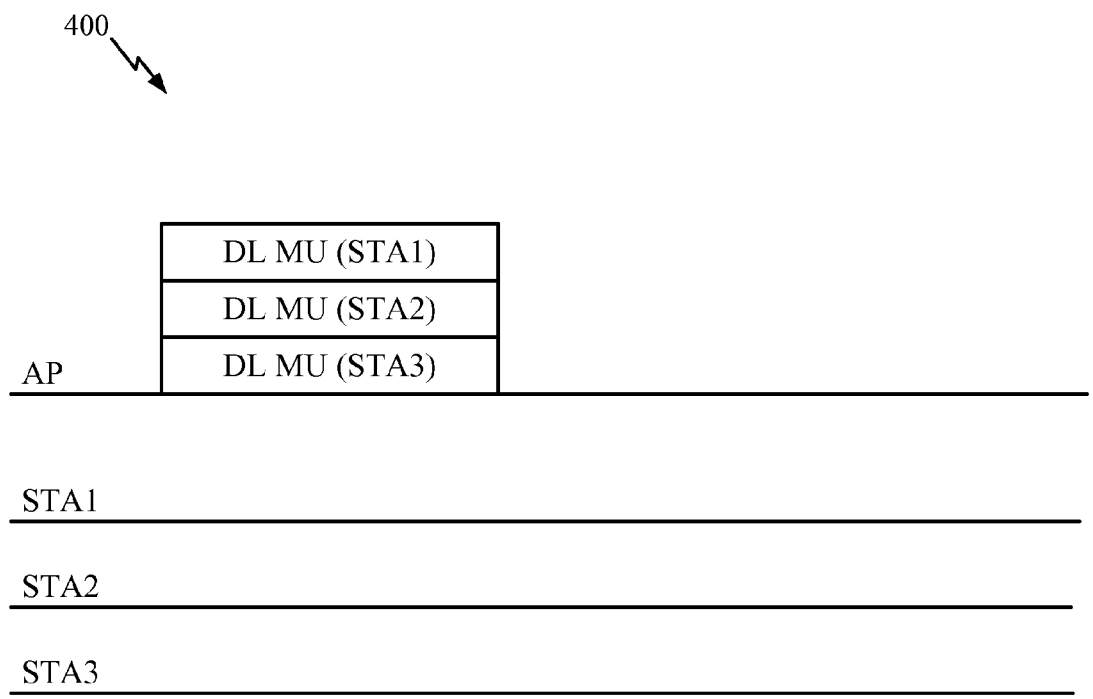
FIG. 4 is a time sequence diagram illustrating an example multi-user (MU) transmission, in accordance with certain aspects of the present disclosure.

According to certain aspects of the present disclosure, in multiple user (MU) communications, an uplink (UL) signal may be transmitted simultaneously from multiple user terminals (UTs) to an access point (AP), or alternatively, a downlink (DL) signal may be transmitted from an AP to multiple UTs simultaneously. FIG. 4 is a time sequence diagram illustrating an example MU transmission from an AP to multiple stations (e.g., STA1, STA2, and STA3 illustrated in FIG. 4), in accordance with certain aspects of the present disclosure.

For certain systems (e.g., IEEE 802.11ac systems) a group identification (GID) may be defined, for example, at the physical (PHY) layer. A group of stations may be assigned to the same GID, which indicates that data transmitted in the packet are sent to stations in this group. Stations in a group may be co-scheduled for MU multiple-input multiple-output (MU-MIMO) transmissions. The GID enables the receiver of a MU transmission to determine if the payload (e.g., in a PHY layer convergent protocol (PLCP) packet) includes a frame intended for that receiver. In one example, if the receiver determines that it is not intended to receive any payload, the receiver may enter a power save mode for the remainder of the transmission opportunity (TXOP). The GID may be included in a preamble of the packet. Each stations position within the group conveys the station's spatial stream position (i.e., which spatial stream in the MU-MIMO transmission is intended for that co-scheduled STA).

Figure 5:
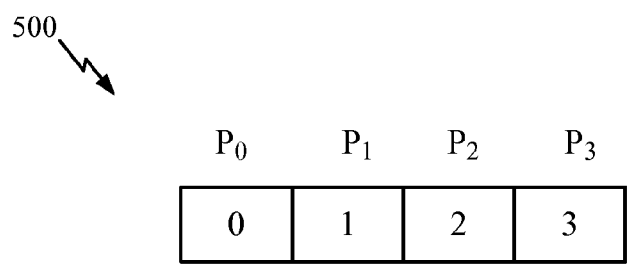
FIG. 5 is an example diagram illustrating a group identification (GID) matrix with no-overloading, in accordance with certain aspects of the present disclosure.

In fixed (i.e., static) grouping, each MU-capable station belongs to only one MU group with a fixed set of partner stations. For example, each group may contain up to four stations and 62 different GIDs may be used for MU-MIMO transmission. Thus, 248 stations may be grouped. However, for large numbers of stations, for example, greater than 248 stations (i.e., 62×4), 62 GIDs are not sufficient to cover all stations. Furthermore, if each station appears in only one group with 3 partner stations, forming MU packets may be limited if some or all of the partner stations do not have enough traffic. In this case, rather forming MU3 PPDUs, MU2 or SU transmissions, which have lower MU gain. FIG. 5 is an example diagram illustrating a GID matrix 500 with no GID overloading, in accordance with certain aspects of the present disclosure. As shown in FIG. 5, the example GID 500 contains one group with up to four stations (0 1, 2, 3), each of the four stations in a different group position ($P_0$, $P_1$, $P_2$, $P_3$). In the example illustrated in FIG. 5, station 0 may be the primary station and station 2 and station 3 may not have enough packets for MU transmission. In this case, an MU2 transmission to station 0 and station 1 would be sent.

Example Robust Systematic MU Grouping and Scheduling Scheme

Aspects of the present disclosure generally relate to wireless communications and, more particularly, to a robust and systematic multi-user (MU) grouping and scheduling scheme. As will be described in more detail herein, devices (e.g., MU capable stations) may be grouped and scheduled in a manner intended to help ensure a consistent throughput as well as fairness.

In some cases, stations may be grouped in a manner that ensures each station is in a first or second position in at least one of the groups. Further, a round-robin type algorithm may be applied to schedule subsets of stations from different groups. This may help ensure fairness and prevent any one station from being scheduled multiple times before other stations have been scheduled at all.

A "device" may refer to a station (STA) that supports multi-user (MU) MIMO communications. Such device may also be referred to herein as a user or a client. According to certain aspects, an "active device" may refer to a device that has associated with the access point (AP) and is added to an MU group by the AP. A user ID (UID) is a unique identifier for an active device that may be defined as the order in which the active device is associated or added to an MU group. Herein, the UID for sequential devices may be indicated alphabetically, with "A" indicating a UID of a first associated device, "B" indicating a UID of the next associated device, and so on.

Figure 6:
FIG. 6 is a table illustrating an on demand approach to grouping and scheduling of devices.

FIG. 6 is a table 600 illustrating an on demand approach to grouping and scheduling of devices. As shown in FIG. 6, for three MU stations (users) (M=3), grouping may be straight forward, and a single group may be formed with the three users (e.g., stations), for example, a primary user A, and partners B and C. The stations may be scheduled for MU3 transmission first scheduling the primary user in the first position followed by the partners (ABC), then scheduling with the partners in the first position (BCA, CAB).

Forming an MU group on-demand when a new station associates with the AP can lead to a non-uniform achieved throughput versus number of MU clients. When a new station is associated, the AP may add the newly associated station to an existing MU group if the group currently has less than three stations, for example; otherwise, the AP may create a new group with the newly associated station. For example, as shown in FIG. 6, when a fifth MU client is added, the group DE may be formed and MU2 transmissions scheduled. Thus, in some instances the AP will form groups with three stations (MU3) and in other instances the AP will form group with only two stations (MU2). Since MU2 transmission achieves lower throughput than MU3 transmissions—and consequently lower MU gain—the throughput is thus non-uniform across the different instances of MU2 and MU3 transmissions.

Further, on-demand MU grouping may not be robust to traffic variations. For example, if the traffic for one or more stations in a formed MU3 group drops, an MU2 or single user (SU) transmission may be performed which also leads to throughput degradation.

Accordingly, techniques for MU grouping and scheduling that are robust to traffic variations and that will maintain more uniform throughput are desirable.

Techniques are provided herein for a systematic MU grouping scheme and scheduling sequence that guarantees balanced throughput for MU clients, allows for MU3 transmission for any number of MU clients, provides for "Round Robin" fairness among stations, and is robust to traffic variations since a station may appear in multiple groups rather than appearing in only one group (as is the case in on-demand grouping).

Figure 7:
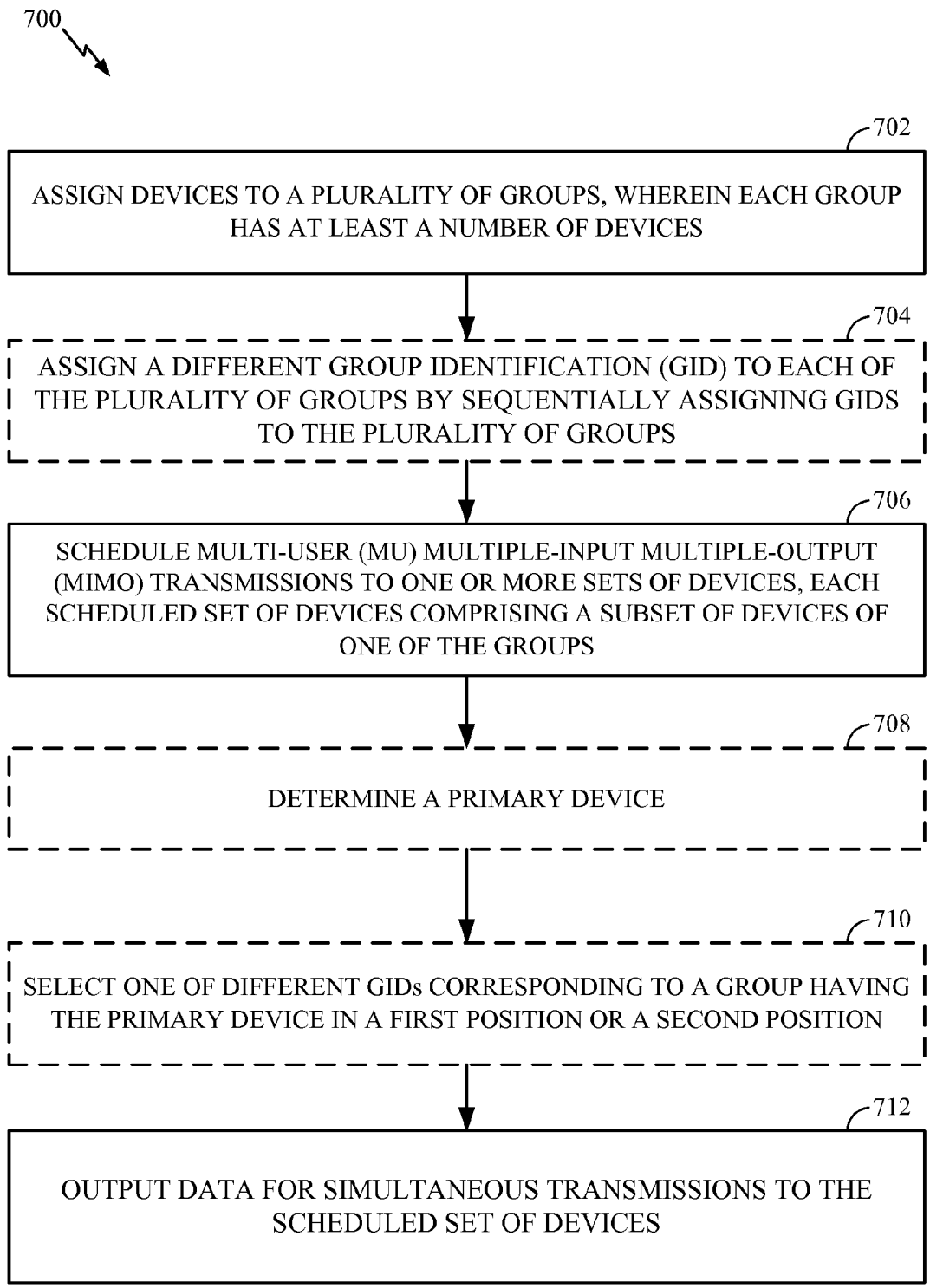
FIG. 7 is a flow diagram of example operations for wireless communications, in accordance with certain aspects of the present disclosure.
Figure 7A:
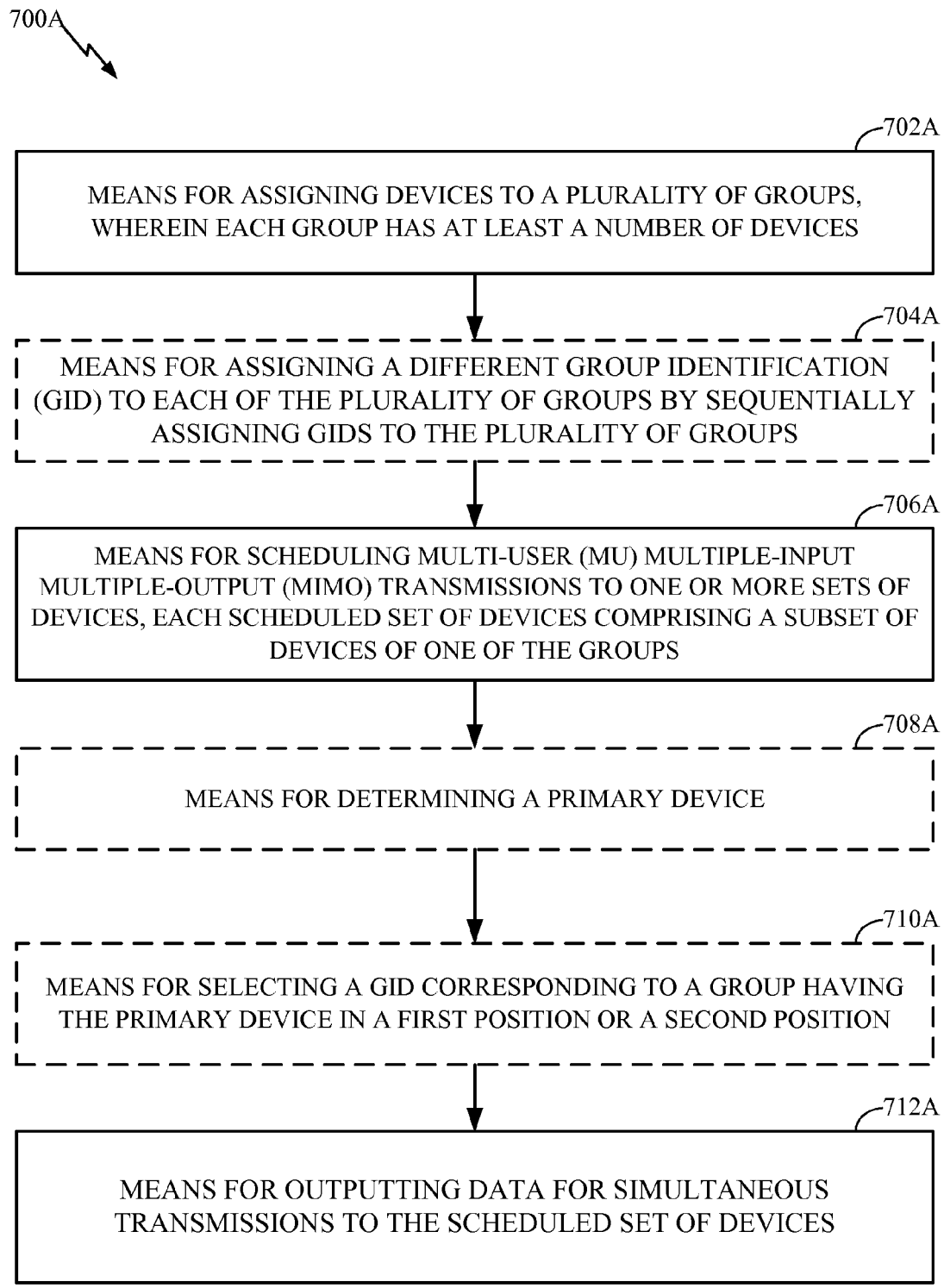
FIG. 7A illustrates example means capable of performing the operations shown in FIG. 7.

FIG. 7 is a flow diagram of example operations 700 for wireless communications, in accordance with certain aspects of the present disclosure. Operations 700 may be performed, for example, by an AP (e.g., such as AP 110). Operations 700 may begin, at 702, by assigning devices (e.g., MU capable STAs) to one or more groups, wherein each group has at least a number of devices (e.g., 4 STAs). For example, as will be described in more detail below in reference to FIGS. 8-10, the AP may assign the devices according to a round-robin type algorithm by iteratively (e.g., sequentially) assigning devices to groups until each device has been assigned to at least a first position or a second position within one of the groups.

According to certain aspects, at 704, the AP may further assign a different GID to each of the plurality of groups by sequentially assigning GIDs to the plurality of groups.

At 706, the AP may schedule MIMO transmissions to one or more sets of devices, each scheduled set of devices comprising a subset of devices (e.g., sets of 3) of one of the groups. For example, as will be described in more detail below in reference to FIG. 8, the AP may schedule the sets of devices by scheduling the subsets of the groups of devices in sequences. Alternatively, as will be described in more detail below in reference to FIGS. 10-11A, the AP may schedule the sets of devices such that the queue is not drained, for example, such that at no point during the MU-MIMO transmissions does any device receive greater than a threshold number (e.g., 1) of transmissions more than any other device. According to certain aspects, the scheduling may include, at 708, determining a primary device and, at 710, selecting a GID corresponding to a group having the primary device in a first position or a second position.

At 712, the AP may output data for simultaneous transmissions (e.g., MU3) to the scheduled sets of devices.

FIG. 8 is a table 800 illustrating an approach for MU grouping and scheduling, in accordance with certain aspects of the present disclosure, and will be discussed in greater detail below.

Example MU Grouping

According to certain aspects, MU devices (e.g., MU STAs) associated with the AP may be formed into groups. According to a proposed algorithm for forming MU groups, shown in FIG. 8, MU devices (clients) may be assigned to groups having an equal number of devices (e.g., four per group). According to certain aspects, grouping may be performed in a manner that ensures that each of the devices appears in a first position or a second position within at least one of the groups.

Figure 9:
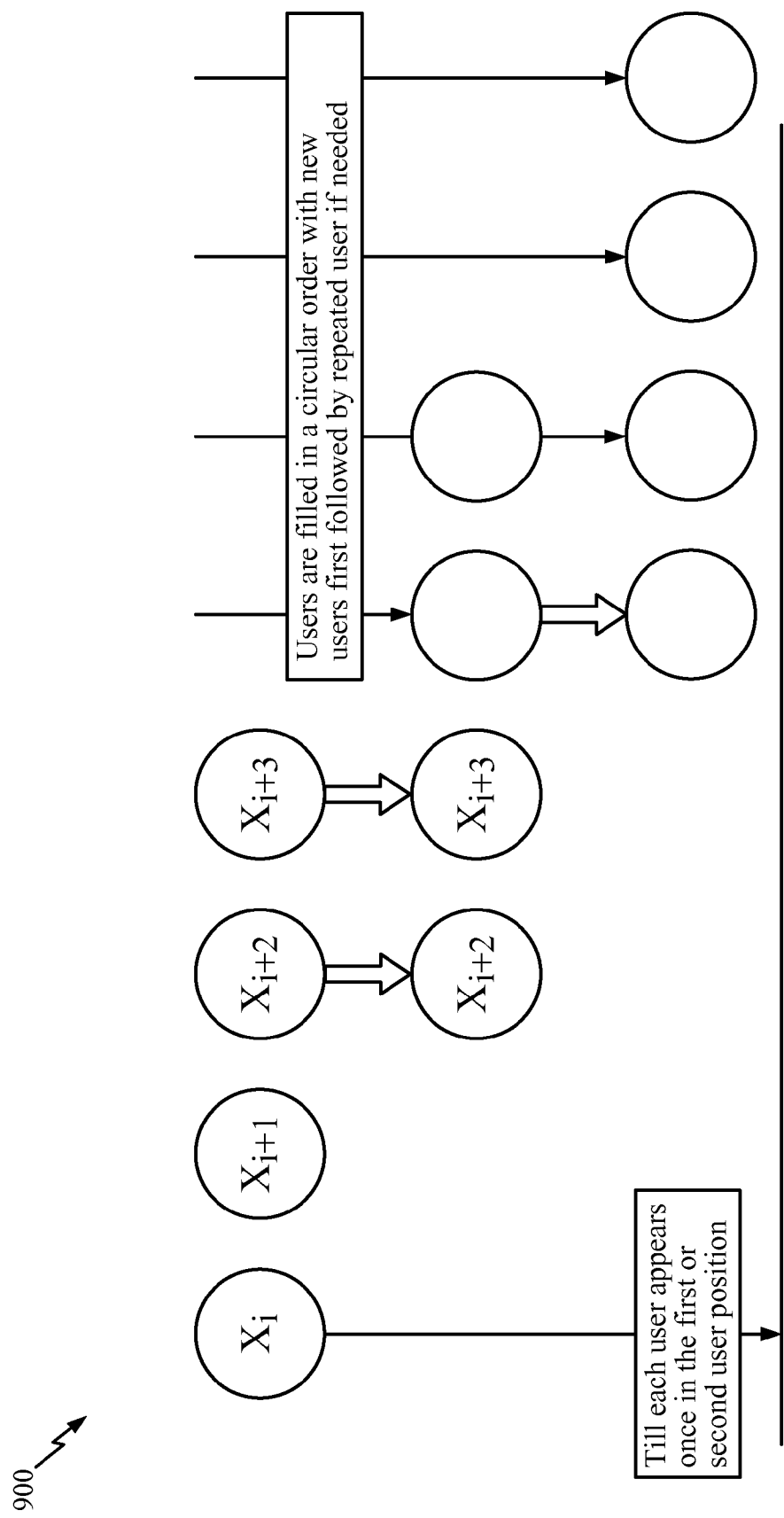
FIG. 9 is a diagram illustrating an example algorithm for grouping MU clients, in accordance with certain aspects of the present disclosure.

If the number of MU clients being grouped is equal to the group size, the grouping may be straightforward. In the example shown in FIG. 8, if the AP has four MU clients (i.e., active associated stations that support MU communication), the AP may form only one group (ABCD) for the four clients and may use one group identification (GID). If the AP has a larger number of MU devices (e.g., M≥5), the AP may form groups such that each MU client is in the first position or second position with at least one group. For example, FIG. 9 is a diagram illustrating an example algorithm 900 for grouping MU clients, in accordance with certain aspects of the present disclosure. As shown in FIG. 9, the first four MU clients may be grouped in the first group in sequential order (ABCD). Further groups may be formed in a circular "round-robin" type order, where each group formed begins with the first two positions in the group assigned to the first two stations that have not yet been assigned in the first or second position in a group. In other words, the stations assigned to each sequential group are shifted by two.

In an illustrative example, as shown in FIGS. 8 and 9, for six MU clients, the first group (ABCD) may include the first four stations $X_i$ (A) $X_{i-1}$ (B), $X_{i+2}$ (C), and $X_{i+3}$ (D), then a second group (CDEF) may be formed with the stations $X_{i+2}$, and $X_{i+3}$ in the first and second group positions, respectively, followed by the remaining two stations $X_{i+4}$ (E) and $X_{i+5}$ (F). A third group (EFAB) may be formed with stations $X_{i+4}$, and $X_{i+5}$ in the first and second group positions, respectively, followed by circling back to stations $X_i$, and $X_{i+1}$. Since each of the six stations has been assigned to a first or second position within a group, no more groups may be formed.

Although FIGS. 8 and 9 illustrate one technique for forming the groups, the groups could be formed according to different methods or algorithms, such that the devices are grouped with each device appearing within a first position or a second position within at least one group.

Each of the three groups may be assigned a GID, in order of increasing GID (e.g., the first group may have the smallest GID and the third group may have the largest GID). According to certain aspects, for grouping an even number of MU clients, the last group (largest GID) may have the first two stations (AB) in the third and fourth positions, respectively. For an odd number of MU clients, the last group (largest GID) may have the first three stations (ABC) in the second, third, and fourth positions, respectively.

According to certain aspects, after forming MU groups, for example following the algorithm 900 illustrated in FIG. 9, an additional MU client may be added (e.g., associate with the AP). In this case, rather than reforming each of the existing groups, some of the groups may remain intact, while others may be dismantled and new groups may be formed, in order to achieve the appropriate grouping. For example, referring to FIG. 8, if M=4, the group ABCD may be formed. In this case, if a fifth MU client is added, the AP may keep the first group and may form the additional groups CDEA and EABC.

For adding MU clients beyond 5, existing groups may be dismantled. For example, if the number of MU clients is even after adding a new MU client, then the last two existing groups (largest two GIDs) may be dismantled and two new groups may be formed. Continuing the above example, if another MU client is added, bringing the total number of MU clients to 6, then the group ABCD may remain intact; however, the last two groups CDEA and EABC may be dismantled and two new groups CDEF and EFAB may be formed.

Alternatively, if the number MU clients is odd after adding a new MU client (beyond 5), then the last existing group (largest GID) may be dismantled and two new groups may be formed. For example, further continuing the above example, if yet another MU client added, bringing the total number of MU clients to 7, then the groups ABCD and CDEF may remain intact; however, the last group EFAB may be dismantled and two new groups EFGA and GABC may be formed.

Example MU Scheduling

According to certain aspects, the AP may schedule sets of the grouped MU devices in a scheduling sequence for MU-MIMO transmissions. For example, the AP may schedule different MU-MIMO transmissions to subsets of stations from each of the formed groups. According to certain aspects, the MU devices may be scheduled in sets having an equal number of MU devices. Each set may be formed as a subset of stations in a group (e.g., each subset being three out of the four stations in a group).

According to certain aspects, as will be described below with respect to FIG. 10, a scheduling sequence may be enhanced to promote fairness by ensuring that the MU devices are scheduled such that, at any time during the MU-MIMO transmissions to the scheduled devices, none of the MU-devices has received greater than a threshold number (e.g., one) of MU-MIMO transmissions more than any of the other scheduled MU devices. This scheduling may be considered as a round-robin algorithm in that it may ensure, for example, that each station is scheduled at least once before any station is scheduled more than once.

As shown in FIG. 8, the AP may schedule sets of three MU clients for simultaneous MIMO transmissions (MU3) for any of the number of the grouped MU clients—for example, grouped according to the grouping algorithm discussed above with respect to FIGS. 8 and 9. According to certain aspects, in the proposed scheduling algorithm, the AP may schedule sets of three stations in a sequence with each sequential station (e.g., according to a user ID (UID)) scheduled in a first position within the set followed by the next two sequential stations.

In an illustrative example, as shown in FIG. 8, for four MU clients (M=4), the four stations (A, B, C, and D) may be scheduled in a first set, with the first station in the first position followed by the next two sequential stations (ABC), in a second set with the second station in the first position followed by the next two sequential stations (BCD), and so on for each of the stations (CDA, DAB).

According to one proposed algorithm for a scheduling sequence, and as shown in FIG. 10, the AP may schedule sets of three MU clients (e.g., MU clients that have been grouped according to the algorithm discussed above with respect to FIGS. 8 and 9) for MU3 transmission, in an effort to fairly schedule transmissions to different stations (which may help avoid draining queues of certain stations due to overscheduling). For example, as shown in FIG. 10, the MU clients may be scheduled sequentially such that, at any given time during MU MIMO transmissions, each MU client is scheduled to receive at least one MU-MIMO transmission before any client receives an additional MU-MIMO transmission.

According to certain aspects, as shown in FIG. 10, the AP may schedule sets of three stations in a sequence with each sequential station (e.g., according to UID), beginning with the first stations scheduled until each of the stations has been scheduled. The AP may continue to schedule sets of three stations in a sequence, beginning with the second station, up until the number of sets equals the number of stations being scheduled.

In the illustrative example shown in FIG. 10, for five MU clients (M=5), the five stations (A, B, C, D, E) may be scheduled in sets of three, beginning with the first station (A), sequentially until each station has been scheduled (ABC, DEA). The AP may continue to schedule sets of three until the number of sets equals the number of stations (e.g., five in this example) being scheduled (BCD, EAB, CDE). Thus, each one of MU client A, B, C, D, E is scheduled for an MU-MIMO transmission before scheduling any of the devices for a second MU-MIMO transmission, then each MU client can be scheduled for a second MU-MIMO transmission before any of the MU clients are scheduled for a third MU-MIMO client, and so on, such that any MU client is never scheduled for greater than 1 more MU-MIMO transmission than any of the other MU clients.

FIG. 11 is a table 1100 illustrating the number of times each station is targeted for transmission at a given time during the scheduling sequence illustrated in FIG. 8, in accordance with certain aspects of the present disclosure. In the example illustrated in FIG. 11, the number of MU clients is 7 (shown in the table as clients A, B, C, D, E, F, G) and the clients are scheduled for MU transmissions according to the grouping and scheduling sequence discussed above with respect to FIG. 8. As shown in FIG. 11, according to the scheduling sequence, after three MU transmissions, client C will have been targeted for transmission three times, whereas, clients F and G will not have been targeted. Thus, the queue for client C may be become drained.

Figure 11A:
FIG. 11A is a table illustrating the number of times each station is targeted for transmission at a given time during the enhanced scheduling sequence illustrated in FIG. 10, in accordance with certain aspects of the present disclosure.

FIG. 11A is a table 1100A illustrating the number of times each station is targeted for transmission at a given time during the enhanced scheduling sequence illustrated in FIG. 10, in accordance with certain aspects of the present disclosure. In the example illustrated in FIG. 11A, the number of MU clients is 7 (shown in the table as clients A, B, C, D, E, F, G) and the clients are scheduled for MU transmissions according to the grouping and scheduling sequence discussed above with respect to FIG. 10. As shown in FIG. 11A, by scheduling according the algorithm discussed above with respect to FIG. 10 (or a similar algorithm), the clients may be targeted for transmission more evenly. For example, as shown in FIG. 11A, at any given time, none of the clients has been targeted more than one time more than any other client.

Example Group Selection for Primary User

According to certain aspects, the AP may select a group (GID) according to a proposed algorithm. The proposed algorithm may guarantee primary user fairness. For example, according to the proposed algorithm, for each primary user, the AP may select a group in which the primary user appears in the earliest user position (e.g., in the first or second position). There may be a one-to-one mapping between UID of a station and the GID in which that station can be a primary user. According to certain aspects, the one-to-one mapping between UID and GID (where the station associated with the UID can be a primary user) may be calculated according the following Equation 1.

$$GID_p(UID) = \left\lfloor \frac{UID}{2} \right\rfloor + 1 \quad\quad \text{Eq. 1}$$

where $GID_p$ (UID) is the group ID in which the station associated with a particular UID appears as the primary user. According to certain aspects, GID 0 and GID 63 may be reserved for single user (SU) communications.

Figure 12:
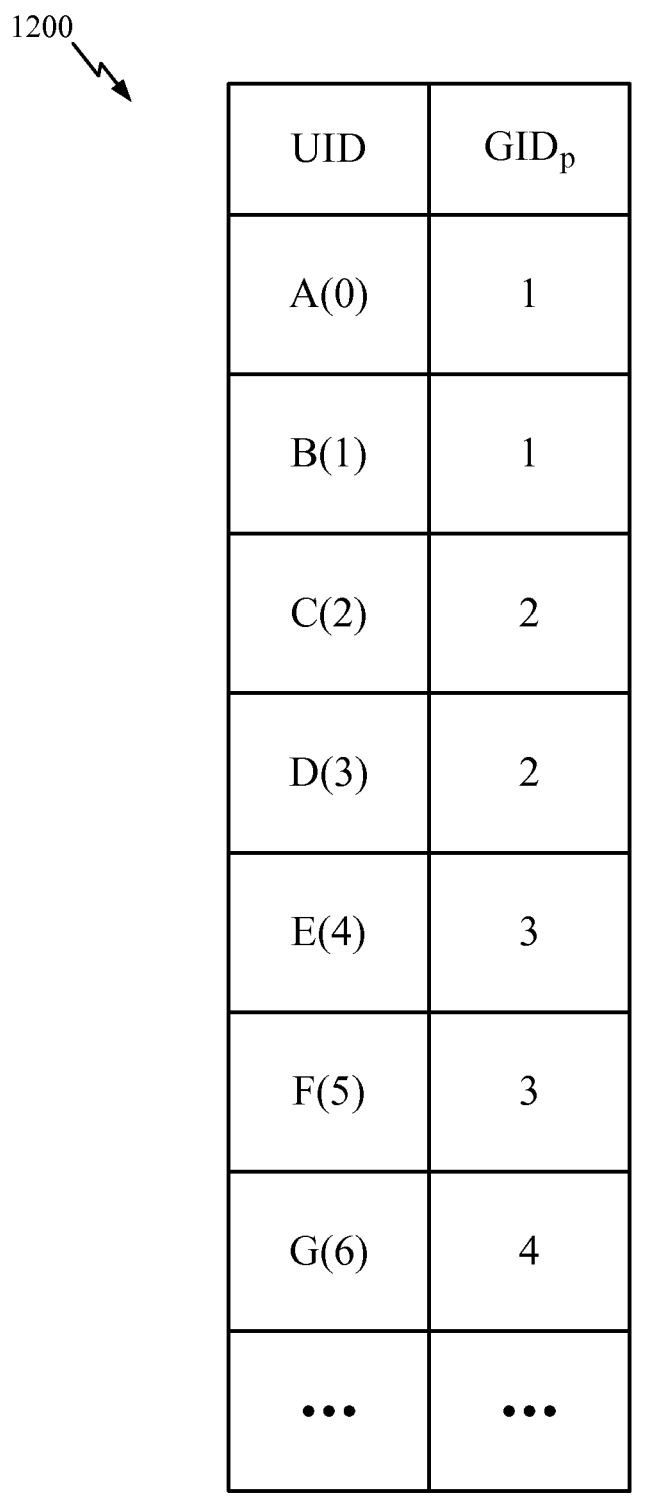

FIG. 12 is a table 1200 illustrating an example of the one-to-one mapping for the first seven MU clients, for example, calculated according to Eq. 1. According to certain aspects, the one-to-one mapping may be calculated on-the-fly according to Eq. 1, or alternatively, may be stored as a lookup table, for example, as shown in FIG. 12. In an illustrative example of the one-to-one mapping according to Eq. 1 and FIG. 12, for seven MU clients (M=7), as shown in FIGS. 8-10, the AP may form the groups ABCD (GID 1), CDEF (GID 2), EFGA (GID 3), and GABC (GID 4). Thus, user "A" appears as a primary user in GID 1 (i.e., in the first position), user "B" appears as a primary user in GID 1 (i.e., in the second position), user "C" appears as a primary user in GID 2 (i.e., in the first position), user "D" appears as a primary user in GID 2 (i.e., in the second position), user "E" appears as a primary user in GID 3 (i.e., in the first position"), user "F" appears as a primary user in GID 3 (i.e., in the second position), and user "G" appears as a primary user in GID 4 (i.e., in the first position).

According to certain aspects, according the proposed group formation algorithm, for example, as discussed with respect to FIGS. 8-10, each user may appear in a minimum of two groups (GIDs) and a maximum of three groups (GIDs). The GIDs corresponding to the groups a user appears may be calculated according to the following Eqs. 2-5:

$$\text{for } UID = 0 \ (A) \rightarrow GIDs \ (A) = \{1, M-1, M\} \ \text{if } M \text{ is odd} \quad \text{Eq. 2}$$
$$= \{1, M\} \quad\quad \text{if } M \text{ is even}$$

$$\text{for } UID = 1 \ (B) \rightarrow GIDs \ (B) = \{1, M\} \quad\quad \text{Eq. 3}$$

$$\text{for } UID = 0 \ (C) \rightarrow GIDs \ (C) = \{1, 2, M-1\} \ \text{if } M \text{ is odd} \quad \text{Eq. 4}$$
$$= \{1, M\} \quad\quad \text{if } M \text{ is even}$$

$$\text{for } UID = m \rightarrow GIDs \ (m) = \left\{ \left\lfloor \frac{m}{2} \right\rfloor + 1, \left\lfloor \frac{m}{2} \right\rfloor + 2 \right\}, m \neq 1, 2, 3 \quad \text{Eq. 5}$$

According to certain aspects, applying the proposed algorithms herein for grouping and scheduling, the number of MU clients may be limited by the number of GIDs. For more than four MU clients, one additional GID may support two additional MU clients. Thus, for example, sixty-two GIDs may support up to 124 MU clients without GID overloading. For more than 124 MU clients, GIDs may be overloaded (e.g., reused). The techniques disclosed herein may be systematic and lead to uniform throughput for any number of MU clients and may be robust to traffic variations. The techniques may improve host flow control since more groups may be formed. For example, if some stations lack traffic at a certain time, the AP may search for a group that has MU3 transmissions for the other stations that do have traffic.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 600 illustrated in FIG. 6 correspond to means 600A illustrated in FIG. 6A.

For example, means for obtaining and means for receiving may be a receiver (e.g., the receiver unit of transceiver 254) and/or an antenna(s) 252 of the user terminal 120 illustrated in FIG. 2 or the receiver (e.g., the receiver unit of transceiver 222) and/or antenna(s) 224 of access point 110 illustrated in FIG. 2. Means for outputting and means for transmitting may be a transmitter (e.g., the transmitter unit of transceiver 254) and/or an antenna(s) 252 of the user terminal 120 illustrated in FIG. 2 or the transmitter (e.g., the transmitter unit of transceiver 222) and/or antenna(s) 224 of access point 110 illustrated in FIG. 2.

Means for processing, means for determining, means for generating, means for associating, means for selecting, means for assigning, means for scheduling, means for dismantling, and means for skipping may comprise a processing system, which may include one or more processors, such as the RX data processor 270, the TX data processor 288, and/or the controller 280 of the user terminal 120 illustrated in FIG. 2 or the TX data processor 210, RX data processor 242, and/or the controller 230 of the access point 110 illustrated in FIG. 2.

According to certain aspects, such means may be implemented by processing systems configured to perform the corresponding functions by implementing various algorithms (e.g., in hardware or by executing software instructions) described above for providing an immediate response indication in a PHY header. For example, an algorithm for assigning devices to one or more groups, wherein each group has at least a number of devices, an algorithm for scheduling MU MIMO transmissions to one or more sets of devices, each scheduled set of devices comprising a subset of devices of one of the groups, and an algorithm for outputting data for simultaneous transmissions to the scheduled sets of devices.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for assigning devices to one or more groups, wherein each group has at least a number of devices, instructions for scheduling MU MIMO transmissions to one or more sets of devices, each scheduled set of devices comprising a subset of devices of one of the groups, and instructions for outputting data for simultaneous transmissions to the scheduled sets of devices.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
 a processing system configured to:
  iteratively assign devices to different groups of a plurality of groups until each device has been assigned to at least one of a first position or a second position within at least one of the groups, wherein each group comprises a plurality of devices, and wherein each group comprises an equal number of devices; and
  schedule multi-user (MU) multiple-input multiple-output (MIMO) transmissions to one or more sets of devices, each scheduled set of devices comprising a subset of the assigned devices of one of the groups; and
 an interface configured to output data for simultaneous transmissions to the scheduled one or more sets of devices.

2. The apparatus of claim 1, wherein the iterative assignment comprises:
 assigning first and second devices to a last two positions in a first group; and
 assigning the first and second devices to a first two positions in a second group.

3. The apparatus of claim 1, wherein the processing system is configured to schedule the MU MIMO transmissions such that, at any time during the MU MIMO transmissions, no device is scheduled more than a threshold number of times than any other device.

4. The apparatus of claim 3, wherein the threshold number is one.

5. The apparatus of claim 1, wherein the processing system is further configured to:
assign a different group identification (GID) to each of the groups by sequentially assigning GIDs to the groups.

6. The apparatus of claim 5, wherein the processing system is further configured to:
determine a primary device of the assigned devices, and
select one of the different GIDs corresponding to a group having the primary device in a first position or a second position to use for the simultaneous transmissions.

7. The apparatus of claim 1, wherein the processing system is further configured to:
assign a newly associated device to one or more new groups formed by dismantling at least one of the groups.

8. The apparatus of claim 1, wherein the at least one processor is configured to iteratively assign the devices to the different groups of the plurality of groups according to a round-robin algorithm.

9. A method for wireless communications, comprising:
iteratively assigning devices to different groups of a plurality of groups until each device has been assigned to at least one of a first position or a second position within at least one of the groups, wherein each group comprises a plurality of devices, and wherein each group comprises an equal number of devices;
scheduling multi-user (MU) multiple-input multiple-output (MIMO) transmissions to one or more sets of devices, each scheduled set of devices comprising a subset of the assigned devices of one of the groups; and
outputting data for simultaneous transmissions to the scheduled one or more sets of devices.

10. The method of claim 9, wherein the iterative assignment comprises:
assigning first and second devices to a last two positions in a first group; and
assigning the first and second devices to a first two positions in a second group.

11. The method of claim 9, wherein the scheduling comprises:
scheduling the MU MIMO transmissions such that, at any time during the MU MIMO transmissions, no device is scheduled more than a threshold number of times than any other device.

12. The method of claim 11, wherein the threshold number is one.

13. The method of claim 9, further comprising:
assigning a different group identification (GID) to each of the groups by sequentially assigning GIDs to the groups.

14. The method of claim 13, further comprising:
determining a primary device of the assigned devices, and
selecting one of the different GIDs corresponding to a group having the primary device in a first position or a second position to use for the simultaneous transmissions.

15. The method of claim 9, further comprising:
assigning a newly associated device to one or more new groups formed by dismantling at least one of the groups.

16. An apparatus for wireless communications, comprising:
means for iteratively assigning devices to different groups of a plurality of groups until each device has been assigned to at least one of a first position or a second position within at least one of the groups, wherein each group comprises a plurality of devices, and wherein each group comprises an equal number of devices;
means for scheduling multi-user (MU) multiple-input multiple-output (MIMO) transmissions to one or more sets of devices, each scheduled set of devices comprising a subset of the assigned devices of one of the groups; and
means for outputting data for simultaneous transmissions to the scheduled one or more sets of devices.

17. The apparatus of claim 16, wherein the iterative assignment comprises:
assigning first and second devices to a last two positions in a first group; and
assigning the first and second devices to a first two positions in a second group.

18. The apparatus of claim 16, wherein the scheduling comprises:
scheduling the MU MIMO transmissions such that, at any time during the MU MIMO transmissions, no device is scheduled more than a threshold number of times than any other device.

19. The apparatus of claim 18, wherein the threshold number is one.

20. The apparatus of claim 16, further comprising:
means for assigning a different group identification (GID) to each of the groups by sequentially assigning GIDs to the groups.

21. The apparatus of claim 20, further comprising:
means for determining a primary device of the assigned devices, and
means for selecting one of the different GIDs corresponding to a group having the primary device in a first position or a second position to use for the simultaneous transmissions.

22. The apparatus of claim 16, further comprising:
means for assigning a newly associated device to one or more new groups formed by dismantling at least one of the groups.

23. An access point, comprising:
a processing system configured to:
iteratively assign devices to different groups of a plurality of groups until each device has been assigned to at least one of a first position or a second position within at least one of the groups, wherein each group comprises a plurality of devices, and wherein each group comprises an equal number of devices; and
schedule multi-user (MU) multiple-input multiple-output (MIMO) transmissions to one or more sets of devices, each scheduled set of devices comprising a subset of the assigned devices of one of the groups; and
a transmitter configured to transmit data simultaneously to the scheduled one or more sets of devices.

* * * * *